(12) United States Patent
Franz et al.

(10) Patent No.: US 10,145,286 B2
(45) Date of Patent: Dec. 4, 2018

(54) METHOD FOR OPERATING AN SCR CATALYTIC CONVERTER SYSTEM OF AN INTERNAL COMBUSTION ENGINE

(71) Applicant: Robert Bosch GmbH, Stuttgart (DE)

(72) Inventors: Alexander Franz, Gaertringen (DE); Andreas Fritsch, Waiblingen (DE)

(73) Assignee: Robert Bosch GmbH, Stuttgart (DE)

( * ) Notice: Subject to any disclaimer, the term of this patent is extended or adjusted under 35 U.S.C. 154(b) by 91 days.

(21) Appl. No.: 15/343,839

(22) Filed: Nov. 4, 2016

(65) Prior Publication Data

US 2017/0130628 A1 May 11, 2017

(30) Foreign Application Priority Data

Nov. 9, 2015 (DE) .......................... 10 2015 221 982

(51) Int. Cl.
| | |
|---|---|
| *F01N 11/00* | (2006.01) |
| *F01N 3/20* | (2006.01) |
| *F01N 3/023* | (2006.01) |
| *F01N 3/035* | (2006.01) |
| *F01N 3/28* | (2006.01) |
| *F01N 9/00* | (2006.01) |
| *F01N 13/00* | (2010.01) |

(52) U.S. Cl.
CPC ............ *F01N 3/208* (2013.01); *F01N 3/023* (2013.01); *F01N 3/035* (2013.01); *F01N 3/2066* (2013.01); *F01N 3/2882* (2013.01); *F01N 9/00* (2013.01); *F01N 9/002* (2013.01); *F01N 13/0093* (2014.06); *F01N 2900/1602* (2013.01); *F01N 2900/1622* (2013.01); *F01N 2900/1812* (2013.01); *Y02T 10/24* (2013.01); *Y02T 10/47* (2013.01)

(58) Field of Classification Search
CPC .......................... F01N 3/208; F01N 13/0093
See application file for complete search history.

(56) References Cited

U.S. PATENT DOCUMENTS

| | | | |
|---|---|---|---|
| 2013/0115150 | A1 | 5/2013 | Fritsch et al. |
| 2014/0147355 | A1 | 5/2014 | Fritsch et al. |

(Continued)

FOREIGN PATENT DOCUMENTS

| | | |
|---|---|---|
| DE | 102011085952 | 5/2013 |
| DE | 102012221905 | 6/2014 |
| DE | 102013217169 | 3/2015 |

*Primary Examiner* — Jonathan Matthias
(74) *Attorney, Agent, or Firm* — Michael Best & Friedrich LLP

(57) ABSTRACT

In a method for operating an SCR catalytic converter system of an internal combustion engine, the SCR catalytic converter system comprises at least one SCR catalytic converter (30) and at least one upstream SCR-coated particulate filter (20). In order to inject liquid reducing agent for the SCR catalytic converter (30) and/or for the SCR-coated particulate filter (20), a first injection position is provided upstream of the SCR-coated particulate filter (20) in the form of a first metering device (40) and a second injection position is provided upstream of the SCR catalytic converter (30) and downstream of the SCR-coated particulate filter (20) in the form of a second metering device (50). The injection positions for the injection of liquid reducing agent are selected in a manner which is dependent on the operating states of the SCR catalytic converter system.

14 Claims, 1 Drawing Sheet

(56) References Cited

U.S. PATENT DOCUMENTS

2015/0167526 A1* 6/2015 Henry ................. F01N 3/103
                                                                        60/274
2015/0275730 A1* 10/2015 Gupta ................. F01N 3/208
                                                                        60/274

* cited by examiner

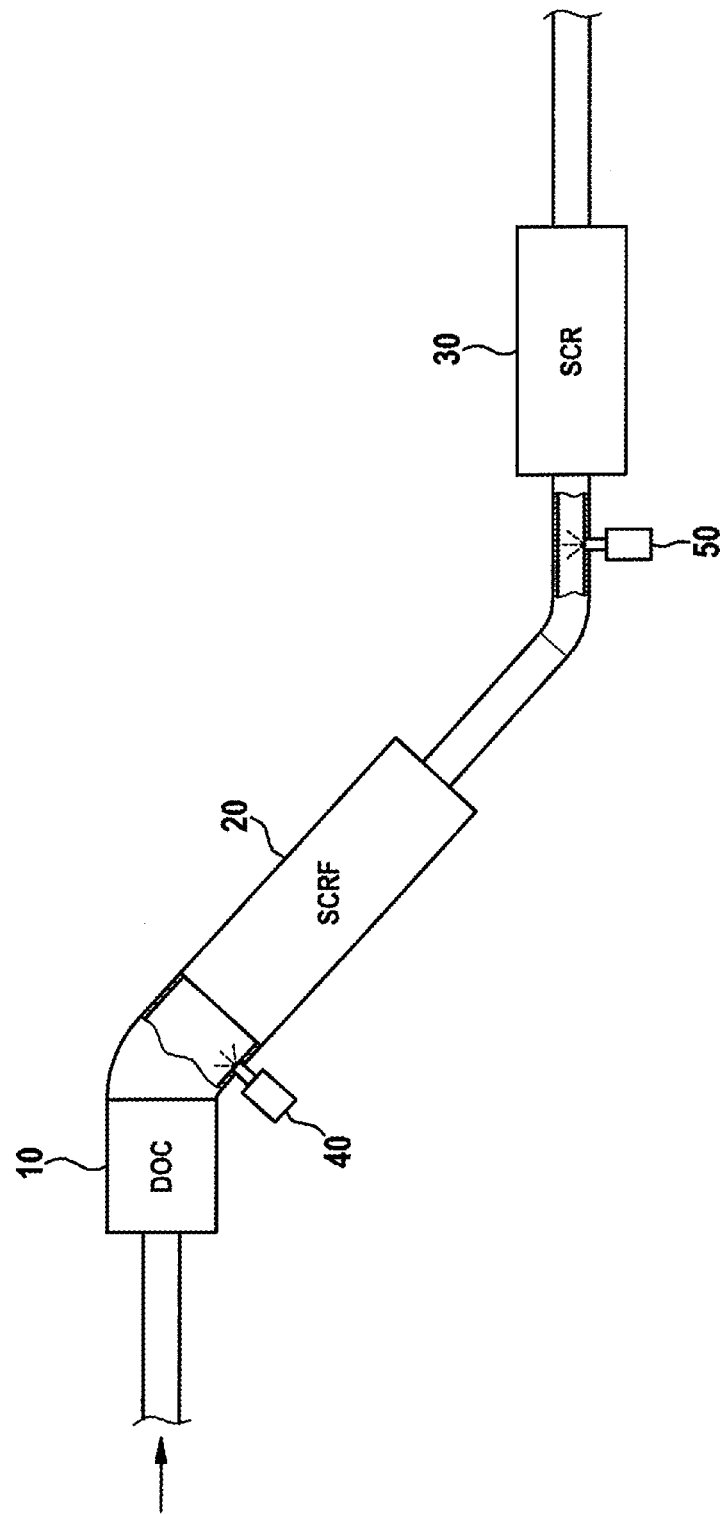

METHOD FOR OPERATING AN SCR CATALYTIC CONVERTER SYSTEM OF AN INTERNAL COMBUSTION ENGINE

BACKGROUND OF THE INVENTION

The present invention relates to a method for operating an SCR catalytic converter system of an internal combustion engine, the SCR catalytic converter system comprising at least one SCR catalytic converter and at least one upstream SCR-coated particulate filter. Furthermore, the invention relates to an SCR catalytic converter system which is set up for carrying out the method, and to a computer program, a machine-readable storage medium, and an electronic control unit which are provided for carrying out the method.

Methods and apparatuses for operating an internal combustion engine, in particular in motor vehicles, are known, in the exhaust gas region of which an SCR (Selective Catalytic Reduction) catalytic converter is arranged which reduces the nitrogen oxides (NOx) contained in the exhaust gas of the internal combustion engine to form nitrogen in the presence of a reducing agent. In particular, ammonia ($NH_3$) or else, for example, formic acid can be used as reducing agent for the process of the reaction. The reducing agent or a precursor thereof is mixed into the exhaust gas upstream of the catalytic converter, as viewed in the exhaust gas direction, by, for example, $NH_3$-separating reagents, in particular a urea/water solution, being injected. The ammonia which is released in the exhaust gas section can react with the undesired nitrogen oxides of the combustion process in the catalytic converter at a corresponding temperature. The required quantity of urea/water solution is generally dependent on the load operation of the internal combustion engine and is injected into the exhaust gas section as required.

SCR catalytic converters which are known nowadays store $NH_3$ on the catalytic converter surface. The NOx conversion in the SCR catalytic converter is more successful, the greater the amount of reducing agent in the catalytic converter. As long as the storage capability of the SCR catalytic converter for $NH_3$ has not yet been exhausted, excessively metered reducing agent is stored. The stored $NH_3$ is also called the $NH_3$ filling level. If less reducing agent is provided than is necessary for the conversion of the nitrogen oxides which are currently present in the exhaust gas, the stored reducing agent is consumed for the conversion of the nitrogen oxides and therefore the $NH_3$ filling level is reduced.

Metering strategies which are known nowadays for SCR systems have what is known as a filling level regulating means which sets an operating point in the form of a setpoint value for the $NH_3$ filling level in an SCR catalytic converter, a temperature-dependent setpoint filling level stipulation forming the basis, for example. Said operating point is selected in such a way that the $NH_3$ filling level is high enough to ensure both an NOx conversion rate and a buffer for briefly occurring NOx peaks. However, the filling level should secondly also be as far as possible from the maximum storage capability, in order to avoid $NH_3$ slip out of the system.

In order to achieve higher conversion rates in the nitrogen oxide reduction in the exhaust gas section, systems are already known which comprise two separate SCR catalytic converter devices. The supply of the SCR catalytic converter devices which are connected behind one another usually takes place in such a way that an injection position for the reducing agent is provided upstream of the first SCR catalytic converter device, as viewed in the exhaust gas direction. Part of the reducing agent which is supplied here is not consumed during the catalysis reaction in the first SCR catalytic converter device and is also not stored here, with the result that said part of the supplied reducing agent leaves the first SCR catalytic converter device again as what is known as $NH_3$ slip. Via said $NH_3$ slip, the second SCR catalytic converter device is supplied with reducing agent, with the result that sufficient reducing agent is also available for the second SCR catalytic converter device, as described, for example, in German laid-open specification DE 10 2011 085 952 A1. Systems of this type having two SCR devices can be controlled for process management in a conventional way by way of double software, it being possible for the variables for the process management for each SCR device to be taken from catalytic converter models which are known per se. Models of SCR catalytic converters can be implemented in the control units of modern motor vehicles and depict both the NOx conversion of the SCR catalytic converter and the $NH_3$ slip. In order to improve the double modelling which is comparatively complicated and susceptible to faults, German laid-open specification DE 10 2012 221 905 A1 describes a method for operating an SCR catalytic converter system with two SCR devices, in which method the metering of the reducing agent is set upstream of the first SCR catalytic converter on the basis of model-based pilot control in a manner which is dependent on a desired overall degree of efficiency.

German laid-open specification DE 10 2013 217 169 A1 describes a method and a system for exhaust gas aftertreatment, the system having an oxidation catalytic converter, a first SCR catalytic converter device and a second SCR catalytic converter device in the direction of the exhaust gas flow. An injector for introducing reducing agent is situated immediately upstream of the first SCR catalytic converter device. One or more further injectors can optionally also be provided along the exhaust gas section, a further injector being situated, for example, between the first SCR catalytic converter device and the second SCR catalytic converter device. A method for operating said exhaust gas aftertreatment system is described, in which method a multiple of the instantaneously required metering of the reducing agent is injected intermittently.

SUMMARY OF THE INVENTION

The method according to the invention proceeds from an SCR catalytic converter system known per se of an internal combustion engine, the SCR catalytic converter system comprising at least one SCR catalytic converter and at least one upstream SCR-coated particulate filter. It is a precondition for carrying out the method according to the invention for operating an SCR catalytic converter system of this type that, in order to inject liquid reducing agent for the SCR catalytic converter and/or for the SCR-coated particulate filter, a first injection position is provided upstream of the SCR-coated particulate filter in the form of a first metering device and a second injection position is provided upstream of the SCR catalytic converter and downstream of the SCR-coated particulate filter in the form of a second metering device. It is a core concept of the invention that the injection positions for the injection of liquid reducing agent, that is to say an injection via the first metering device and/or via the second metering device, are selected in a manner which is dependent on the operating states of the SCR catalytic converter system. By way of said method, particularly advantageous process management for an SCR catalytic converter system of this type can be realized, which process management makes optimum exhaust gas aftertreatment possible with simultaneously minimum reducing agent consumption. In principle, the method according to the invention is not restricted here to an SCR catalytic converter system having an SCR catalytic converter and an upstream SCR-coated particulate filter. Rather, the method according to the invention can also be used for different SCR catalytic converter systems. For example, the method can be used for an SCR catalytic converter system, in which, instead of the SCR-coated particulate filter, a classic particulate filter and additionally an upstream customary SCR catalytic converter are provided. Said system therefore comprises a classic particulate filter and in each case one customary SCR catalytic converter both upstream and downstream of the particulate filter. Here, in the context of the following description of the invention, the particulate filter together with the upstream SCR catalytic converter is to be understood like the upstream SCR-coated particulate filter and the method is to be adapted accordingly. Therefore, in the following description, the SCR-coated particulate filter can be replaced by a classic particulate filter, upstream of which an SCR catalytic converter is connected.

The reducing agent can preferably be a customary aqueous urea solution, for example AdBlue®. However, other reducing agents which are suitable for a selective reduction in the SCR catalytic converter devices can also be used in a corresponding way. The metering devices can be customary metering valves.

An SCR catalytic converter system of this type can be operated in an optimized manner by way of the use of two injection positions for the metering of the reducing agent for the SCR catalytic converter devices. In one particularly preferred refinement of the method according to the invention, an injection of liquid reducing agent is performed substantially via the second injection position or the second metering device in an operating state, in which the temperature of the SCR-coated particulate filter lies above a predefinable threshold value. Here, the expression "substantially" means that the injection takes place predominantly, that is to say in every case by more than 50% or else up to 100%, via the second metering device as long as the metering devices can be operated independently of one another. If the system is designed in such a way that only one or the other metering device can be actuated, this means that the injection takes place exclusively via the second metering device in said aspect of the method. Said embodiment of the method according to the invention is based on the fact that part of the $NH_3$ which is metered in is oxidized in the SCR-coated particulate filter above a certain temperature of the SCR-coated particulate filter, without it being possible for said $NH_3$ to be used for the conversion of the nitrogen oxides. It is therefore very advantageous with regard to the reducing agent consumption to switch over to the second metering device in states of this type.

In the abovementioned operating state, in which the temperature of the SCR-coated particulate filter lies above a predefinable threshold value, this can be, in particular, an operating state, in which a regeneration of the SCR-coated particulate filter is performed. The temperatures during a regeneration of the SCR-coated particulate filter can be, for example, up to 1000° C. in the particulate filter, with the result that no conversion of nitrogen oxides takes place in the particulate filter. The NOx emissions downstream of the SCR-coated particulate filter are therefore very high during the regeneration of the particulate filter. By way of an injection according to the invention of reducing agent downstream of the SCR-coated particulate filter, the downstream SCR catalytic converter can also be supplied sufficiently with reducing agent, with the result that the reduction of the nitrogen oxides in the SCR catalytic converter can take place to a sufficient extent.

In the case of a start of the internal combustion engine, in particular in the case of a cold start, an injection of reducing agent preferably takes place substantially, that is to say predominantly, via the first metering device, it also being possible for the injection of reducing agent to take place exclusively via the first metering device. This is based on the fact that the front catalytic converter, that is to say the SCR-coated particulate filter, lies closer to the internal combustion engine and therefore reaches its operating temperature more rapidly. Therefore, the NOx conversion takes place in a phase directly after the start of the internal combustion engine substantially in the first SCR catalytic converter or in the SCR-coated particulate filter, with the result that it is advantageous to inject upstream of the SCR-coated particulate filter.

During normal operation of the internal combustion engine, the injection is preferably performed at least in phases in a preferred manner via the second metering device. This is based on the fact that the SCR-coated particulate filter is loaded more slowly with soot if no NOx conversion takes place in the SCR-coated diesel particulate filter. Soot is oxidized in the particulate filter by way of the so-called $NO_2$ effect in the SCR-coated particulate filter; the soot is therefore burnt away. Said $NO_2$ effect depends very substantially on the $NO_2$ concentration in the particulate filter. If no NOx conversion takes place in the particulate filter, the $NO_2$ concentration in the particulate filter is greater, with the result that the soot can be burnt off. It is therefore preferred, preferably in phases of the normal operation, in which the exhaust gas composition allows this, that the reducing agent is injected only downstream of the SCR-coated particulate filter.

In the case of the actuation of the metering devices in the context of the method according to the invention, two cases are in principle to be distinguished, which cases are dependent on the specific configuration of the respective SCR catalytic converter system. In the first case, the two metering devices cannot be actuated at the same time because, for example, they are supplied via a common pump. In this case, either only the first metering device or only the second metering device can therefore be actuated. In the second case, the two metering devices can be operated independently of one another, with the result that either the one or the other metering device or both metering devices is/are actuated at the same time, possibly with a different ratio. The first case can be implemented particularly inexpensively because, in comparison with conventional systems which provide only one metering device for the supply of the two SCR catalytic converter devices, only one additional metering device, that is to say an additional metering valve or an additional injector, with a line, has to be installed, for example by means of a T-piece. In the case of the realization of the method according to the invention, a control program then stipulates, via which of the two metering devices injection is carried out. If both metering devices can be actuated at the same time, no switchover has to take place between the individual metering devices and control for the different metering states can be carried out in parallel.

In the following text, first of all the case will be described in greater detail, in which the two metering devices cannot be actuated at the same time. A switchover therefore has to take place between the two metering devices. In principle, two states are therefore possible. In the "metering valve 1" state, the metering takes place via the first metering device. In the "metering valve 2" state, the metering takes place via the second metering device. In suitable control software for the method according to the invention, a corresponding state machine with said two states can be stored. The "metering valve 1" state is preferably active at the beginning of a driving cycle, that is to say after the start of the internal combustion engine. A switchover to the "metering valve 2" state can take place if it is ensured that the second metering device is not faulty and if additionally at least one of the following conditions is met:

a regeneration of the SCR-coated particulate filter takes place and the temperature in the SCR-coated particulate filter lies above a predefinable threshold T1 and the temperature in the SCR catalytic converter lies above a predefinable threshold T2;

the temperature in the SCR-coated particulate filter lies above a predefinable threshold T3 and the temperature in the SCR catalytic converter lies above a predefinable threshold T4, in particular during normal operation;

the $NH_3$ loading of the SCR catalytic converter lies below a predefinable threshold mNH3_1 and the difference of the $NH_3$ loading of the SCR-coated particulate filter from the setpoint value lies in amount terms below a predefinable threshold dmNH3_1 and the temperature in the SCR catalytic converter lies above a predefinable threshold T5 and the NOx mass flow lies below a threshold dmNOx_1;

the first metering device is detected as faulty.

Said thresholds T1 to T5 can be defined as follows:

T1 represents a safety enquiry for the SCR-coated particulate filter and describes the temperature at which ammonia begins to oxidize. Depending on the respective conditions of the system, T1 can lie, for example, below approximately 350° C.

T2 represents a safety enquiry for the SCR catalytic converter and describes a temperature, below which urea is not deposit-free and does not decompose completely to form ammonia. Depending on the respective conditions of the system, T1 can lie, for example, at approximately 180° C.

T3 describes a temperature threshold for the SCR-coated particulate filter during normal operation, $NH_3$ beginning to oxidize when said T3 is exceeded. T3 is preferably lower than or equal to T1. Depending on the respective conditions of the system, T3 can lie, for example, at approximately 350° C.

T4 describes a temperature threshold for the SCR catalytic converter during normal operation, below which urea is not deposit-free and does not decompose completely to form ammonia. T4 preferably corresponds to the value for T2. Depending on the respective conditions of the system, T4 can lie, for example, at approximately 180° C.

T5 denotes an optimum temperature for the SCR catalytic converter, at which high conversion rates can be achieved. The specific optimum temperatures depend on the respective configurations of the catalytic converter, above all with regard to the catalytic converter coating and the volumes. An exemplary optimum temperature can lie, for example, in the region of approximately 225° C.

A switch back to the first metering device can preferably take place when the first metering device is not faulty and when at least one of the following conditions is met:

no regeneration of the SCR-coated particulate filter takes place and the temperature in the SCR catalytic converter lies below a predefinable threshold T6 and the temperature in the SCR-coated particulate filter lies between the predefinable thresholds T7 and T8;

the difference of the $NH_3$ loading of the SCR-coated particulate filter from the setpoint value lies in amount terms above a predefinable threshold dmNH3_2 and the temperature in the SCR-coated particulate filter lies between the predefinable thresholds T9 and T10;

the second metering device is detected as faulty.

Said thresholds T6 to T10 can be defined as follows:

T6 denotes the temperature of the SCR catalytic converter, above which conversion losses are to be expected, since the SCR catalytic converter is too cold, in particular, in comparison with the SCR-coated particulate filter. Depending on the conditions of the system, said temperature can lie, for example, at approximately 250° C.

T7 and T8 denote the temperature limits of the SCR-coated particulate filter, within which satisfactory NOx conversion is to be expected, without too much ammonia being oxidized. Depending on the conditions of the system, T7 can lie, for example, at approximately 180° C. and T8 can lie, for example, at approximately 350° C.

T9 and T10 denote the temperature limits of the SCR-coated particulate filter, within which satisfactory NOx conversion is to be expected, without too much ammonia being oxidized. The values T9 and T10 can differ slightly from T7 and T8, in order to optimize the hysteresis behavior during the switchover between the "metering valve 1" and "metering valve 2" states and in order to avoid toggling. Depending on the conditions of the system, T9 can lie, for example, at approximately 180° C. and T10 can lie, for example, at approximately 325° C.

Said threshold values for the temperatures, the $NH_3$ loading and the mass flows are preferably set in a manner which is dependent on operating characteristic variables and/or states and conditions of the SCR catalytic converter and/or the SCR-coated particulate filter and are therefore adapted to the specific configurations of the respective system.

The thresholds dmNH3_1 and dmNH3_2 can be configured, in particular, as characteristic curves in a manner which is dependent on the respective catalytic converter temperature. The threshold mNH3_1 is preferably dependent at least on the age of the catalytic converter. In a particularly advantageous way, the different threshold values can be configured if required in a manner which is dependent on the exhaust gas temperature, the NOx and exhaust gas mass flows, the $NO_2$ ratio, the ageing state, the incineration and the soot or HC loading of the catalytic converter devices. This can take place, for example, by way of single-dimension or multiple-dimension characteristic diagrams.

It is one particular advantage of the method that, in the case of the SCR catalytic converter system with two metering devices, if one of the metering devices fails, the other metering device can optionally completely take over the injection of the reducing agent, with the result that the exhaust gas aftertreatment in the SCR catalytic converters is secured.

Said switchover conditions are preferably temporally debounced.

In one particularly preferred refinement of the method according to the invention, after a switchover between the metering devices, a further switchover operation can be blocked for a predefinable time duration t1. The predefinable time duration can lie, for example, in a range of a few seconds, for example between 5-20 seconds, for example 10 seconds. This has the advantage that settling is made possible for the hydraulic system by way of the temporal block.

If the injection of the reducing agent takes place via the first metering device, control of the system preferably takes place using model-based pilot control. Here, in particular, the setpoint filling level of the SCR-coated particulate filter reacts to the $NH_3$ loading of the SCR catalytic converter, in a comparable manner to the method which is known from DE 10 2012 221 905 A1. This can also take place when the injection takes place only predominantly and not completely via the first metering device. If the injection takes place completely or at least predominantly via the second metering device, the control functions can be doubled in control software, in particular with regard to the pilot control and the filling level regulator. In this case, the injection can be regulated as in the case of a conventional SCR system by way of setpoint filling level and filling level regulator.

In one refinement of the SCR catalytic converter system, in which the two metering devices can be actuated independently from one another and can therefore also be actuated at the same time, a switchover between the two metering devices is dispensed with. In the case of a refinement of this type of the catalytic converter system, the controllers for both states, that is to say for an injection by the first metering device and for an injection by the second metering device, can be configured in parallel.

Furthermore, the invention comprises an SCR catalytic converter system for an internal combustion engine, the SCR catalytic converter system comprising at least one SCR catalytic converter and at least one upstream SCR-coated particulate filter. In order to inject liquid reducing agent for the SCR catalytic converter and/or for the SCR-coated particulate filter, a first metering device is provided upstream of the SCR-coated particulate filter and a second metering device is provided upstream of the SCR catalytic converter and downstream of the SCR-coated particulate filter, that is to say between the SCR-coated particulate filter and the SCR catalytic converter. According to the invention, said SCR catalytic converter system is set up for carrying out the above-described method.

An oxidation catalytic converter can be connected upstream of the SCR-coated particulate filter. Furthermore, a clean-up catalytic converter can be connected downstream of the SCR catalytic converter. The two metering devices can either be capable of being actuated independently of one another or the metering devices cannot be actuated at the same time because they are supplied with reducing agent, for example, by a common pump. Reference is made to the above description with regard to further features of the SCR catalytic converter system.

Furthermore, the invention comprises a computer program which is set up for carrying out the steps of the described method according to the invention. Furthermore, the invention comprises a machine-readable storage medium, on which a computer program of this type is stored, and an electronic control unit which is set up to carry out the steps of the described method. The realization of the method according to the invention as a computer program or as a machine-readable storage medium or as an electronic control unit has the particular advantage that the method according to the invention can therefore also be used, for example, in existing motor vehicles which have an SCR catalytic converter system with two SCR catalytic converter devices and two metering devices for the required reducing agent. Existing motor vehicles can therefore also be set up for the method according to the invention and can thus utilize the advantages of said method.

BRIEF DESCRIPTION OF THE DRAWING

Further features and advantages of the invention arise from the following description of exemplary embodiments in conjunction with the drawing. Here, the individual features can be realized in each case per se or in combination with one another.

In the drawing, the FIGURE diagrammatically shows the arrangement of catalytic converter devices in an SCR catalytic converter system for carrying out the method according to the invention.

DETAILED DESCRIPTION

FIG. 1 diagrammatically shows an exemplary construction of a catalytic converter system which is suitable for carrying out the method according to the invention. The exhaust gas section of an internal combustion engine (not shown in greater detail) is shown, which exhaust gas section is flowed through by the exhaust gas in the direction of the arrow. The exhaust gas aftertreatment system comprises a diesel oxidation catalytic converter (DOC) 10, which is adjoined by an SCR-coated particulate filter (SCRF) 20. An SCR catalytic converter (SCR) 30 is situated further downstream, downstream of which a further clean-up catalytic converter (CuC) (not shown here) can be connected. A first metering device 40 for liquid reducing agent solution is situated between the diesel oxidation catalytic converter 10 and the SCR-coated particulate filter 20. Said metering device 40 is therefore situated upstream of the SCRF 20. A second metering device 50 for liquid reducing agent solution is situated downstream of the SCRF 20 and at the same time upstream of the SCR 30. The metering devices 40 and 50 can be customary metering valves or injectors. Via the metering devices 40 and 50, an aqueous urea/water solution (for example, AdBlue®) or a comparable reducing medium is introduced as liquid reducing agent solution. Various sensors, in particular for NOx, $NH_3$ and the temperatures, are not shown in greater detail, the signals of which can be used for controlling the exhaust gas aftertreatment. The performance of the method according to the invention is not restricted to an arrangement of this type. In principle, the invention can also be used in other exhaust gas aftertreatment systems, as long as at least two SCR catalytic converter devices (for example, SCRF 20 and SCR 30) and two metering devices for the required reducing agent are provided, a first metering device being arranged upstream of the first SCR catalytic converter device (for example, SCRF 20) and a second metering device being arranged between the first SCR catalytic converter device (for example, SCRF 20) and the second SCR catalytic converter (for example, SCR 30). The system can be configured in such a way that the two metering devices 40 and 50 can be operated independently of one another or, in an inexpensive solution which can be implemented, cannot be actuated at the same time and are supplied, for example, via a common pump.

For the operation according to the invention of an SCR catalytic converter system of this type, a state machine with two states can be stored, for example, in control software. In the "metering valve 1" state, the reducing agent metering takes place via the first metering device 40 and, in the "metering valve 2" state, the reducing agent metering takes place via the second metering device 50. At the beginning of a driving cycle, the "metering valve 1" state is active. A switchover to "metering valve 2" takes place if the metering valve 50 is not faulty and if additionally one of the following conditions is met:

a particulate filter regeneration takes place in the SCRF 20 and the temperature in the SCRF 20 lies above a threshold T1 and the temperature in the SCR 30 lies above the threshold T2.

The temperature in the SCRF 20 lies above a threshold T3 and the temperature in the SCR 30 lies above a threshold T4.

The $NH_3$ loading of the SCR 30 lies below a threshold mNH3_1 and the deviation of the loading of the SCRF 20 from a setpoint value lies in amount terms below a threshold dmNH3_1. In addition, the temperature in the SCR 30 lies above a threshold T5 and the NOx mass flow lies below a threshold dmNOx_1.

The metering device 40 is detected as faulty.

A switch back to "metering valve 2" takes place if the metering valve 40 is not faulty and, in addition, one of the following conditions is met:

no particulate filter regeneration takes place in the SCRF 20 and the temperature in the SCR 30 lies below a threshold T6 and the temperature in the SCRF 20 lies between the thresholds T7 and T8.

The difference of the $NH_3$ loading of the SCRF 20 from a setpoint loading is greater in amount terms than dmNH3_2 and the temperature in the SCRF 20 lies between the thresholds T9 and T10.

All of said switchover conditions are preferably temporally debounced. Furthermore, it is advantageous if, after a switchover operation, further switching requests are blocked for a predefinable time T1, in order to make settling of the hydraulic system possible.

The invention claimed is:

1. A method for operating an SCR catalytic converter system of an internal combustion engine, the SCR catalytic converter system comprising at least one SCR catalytic converter (30) and at least one upstream SCR-coated particulate filter (20), in order to inject liquid reducing agent for the SCR catalytic converter (30) and/or for the SCR-coated particulate filter (20), the method comprising:

providing a first injection position upstream of the SCR-coated particulate filter (20) in the form of a first metering device (40);

providing a second injection position upstream of the SCR catalytic converter (30) and downstream of the SCR-coated particulate filter (20) in the form of a second metering device (50); and selecting injection positions for the injection of liquid reducing agent based on the operating states of the SCR catalytic converter system; and wherein the first metering device (40) is used when the second metering device (50) is detected as faulty and the second metering device (50) is used when the first metering device (40) is detected as faulty.

2. The method according to claim 1, wherein the SCR-coated particulate filter (20), comprises a particulate filter and an SCR catalytic converter positioned upstream of the SCR catalytic converter.

3. The method according to claim 1, wherein, in an operating state in which the temperature of the SCR-coated particulate filter (20) lies above a predefinable threshold value, an injection of liquid reducing agent takes place substantially via the second metering device (50).

4. The method according to claim 1, wherein, in an operating state in which a regeneration of the SCR-coated particulate filter (20) is performed, an injection of liquid reducing agent takes place substantially via the second metering device (50).

5. The method according to claim 1, wherein, in the case of a start of the internal combustion engine, an injection of liquid reducing agent takes place substantially via the first metering device (40).

6. The method according to claim 5, wherein the start of the internal combustion engine is a cold start.

7. The method according to claim 1, wherein, during normal operation, an injection of liquid reducing agent takes place at least in phases via the second metering device (50).

8. The method according to claim 1, wherein, in the case of a start of the internal combustion engine, an injection takes place via the first metering device (40) and a switchover to the second metering device (50) takes place if the second metering device (50) is not faulty and if at least one of the following conditions is met:

a regeneration of the SCR-coated particulate filter (20) takes place and a temperature in the SCR-coated particulate filter (20) lies above a predefinable threshold T1 and a temperature in the SCR catalytic converter (30) lies above a predefinable threshold T2;

a temperature in the SCR-coated particulate filter (20) lies above a predefinable threshold T3 and a temperature in the SCR catalytic converter (30) lies above a predefinable threshold T4;

an $NH_3$ loading of the SCR catalytic converter (30) lies below a predefinable threshold mNH3_1 and a difference of the $NH_3$ loading of the SCR-coated particulate filter (20) from a setpoint value lies in amount terms below a predefinable threshold dmNH3_1 and a temperature in the SCR catalytic converter (30) lies above a predefinable threshold T5 and the NOx mass flow lies below a threshold dmNOx_1;

the first metering device (40) is detected as faulty.

9. The method according to claim 8, wherein a switch back to the first metering device (40) takes place if the first metering device (40) is not faulty and if at least one of the following conditions is met:

no regeneration of the SCR-coated particulate filter (20) takes place and the temperature in the SCR catalytic converter (30) lies below a predefinable threshold T6 and the temperature in the SCR-coated particulate filter (20) lies between the predefinable thresholds T7 and T8;

the difference of the $NH_3$ loading of the SCR-coated particulate filter (20) from the setpoint value lies in amount terms above a predefinable threshold dmNH3_2 and the temperature in the SCR-coated particulate filter (20) lies between the predefinable thresholds T9 and T10;

the second metering device (50) is detected as faulty.

10. The method according to claim 8, wherein, after a switchover between the metering devices (40, 50), a further switchover operation is blocked for a predefinable time duration t1.

11. The method according to claim 1, wherein, in the case of an injection via the first metering device (40), the SCR catalytic converter system is controlled with a model-based pilot control.

12. A non-transitory machine-readable storage medium, on which a computer program for carrying out the method according to claim 1 is stored.

13. A SCR catalytic converter system for an internal combustion engine, the SCR catalytic converter system comprising-:

at least one SCR catalytic converter (30);
at least one upstream SCR-coated particulate filter (20);
a first metering device (40) upstream of the SCR-coated particulate filter (20); and a second metering device (50) is provided upstream of the SCR catalytic converter (30) and downstream of the SCR-coated particulate filter (20); and an electronic control unit configured to control the injection of liquid reducing agent for the SCR catalytic converter (30) and/or for the SCR-coated particulate filter (20) and to select the injection positions for the injection of liquid reducing agent based on the operating states of the SCR catalytic converter system;

wherein the first metering device (40) is used when the second metering device (50) is detected as faulty and the second metering device (50) is used when the first metering device (40) is detected as faulty.

14. The SCR catalytic converter system according to claim 13, wherein the SCR-coated particulate filter (20) comprises a particulate filter and an SCR catalytic converter positioned upstream of the SCR catalytic converter.

* * * * *